Feb. 25, 1958 C. K. GIERINGER 2,824,777

TIME RECORDER

Filed June 13, 1951 4 Sheets-Sheet 1

INVENTOR.
Carl K. Gieringer
BY
Wood, Herron & Evans
ATTORNEYS.

Feb. 25, 1958 C. K. GIERINGER 2,824,777

TIME RECORDER

Filed June 13, 1951 4 Sheets-Sheet 2

INVENTOR.

Carl K. Gieringer

BY

Wood, Herron & Evans

ATTORNEYS.

Feb. 25, 1958 C. K. GIERINGER 2,824,777

TIME RECORDER

Filed June 13, 1951 4 Sheets-Sheet 3

INVENTOR.
Carl K. Gieringer
BY
Wood, Herron & Evans
ATTORNEYS.

Feb. 25, 1958 C. K. GIERINGER 2,824,777

TIME RECORDER

Filed June 13, 1951 4 Sheets-Sheet 4

INVENTOR.
Carl K. Gieringer.
BY
Wood, Herron & Evans.
ATTORNEYS.

United States Patent Office 2,824,777

Patented Feb. 25, 1958

2,824,777

TIME RECORDER

Carl K. Gieringer, Cincinnati, Ohio, assignor to The Cincinnati Time Recorder Company, Cincinnati, Ohio, a corporation of Ohio Application June 13, 1951, Serial No. 231,393

4 Claims. (Cl. 346—83)

This invention relates to time recorders and is particularly directed to a recorder which automatically positions a time card for registration, imprints the time upon the card, and simultaneously notches the card so that it will be properly indexed when it is next inserted in the recorder for printing.

Time recorders are in widespread use in factories, shops and offices where it is desirable to have an accurate printed record of the working time of each employee, in order to facilitate computation of payrolls, taxes, labor costs, and the like. To secure such records, each employee is given a card which he inserts into a time recorder which imprints upon it the time prevailing at the moment of insertion, such as the time of reporting to work, the quitting time, lunch period, etc. When the card is to be used for cost accounting purposes, the time card is inserted into the recorder at the start and stop of each of the various operations performed during the day. At the end of a specified period, usually at the end of each week, each employee's working, or job, time is computed from the figures which have been imprinted upon the respective cards by the recorder.

A time recorder is of utility only if the records which it produces are accurate, reliable, and clearly legible. If the workman fails to insert the card in the proper condition of alignment, or hurriedly inserts it at an angle, or to insufficient depth, as is frequently the case especially at quitting time, then the imprint will not appear in the proper place upon the card. Also, if the workman places the card in the machine properly, causes a print to be made upon it, but then inadvertently immediately repeats the operation, the recorder will overprint upon the first impression and neither will be legible.

The principal objective of this invention has been to provide a time recorder which is actuable only in response to the insertion of a card which is in proper position to receive printing. Otherwise expressed, the primary objective has been to provide a time recorder incapable of overprinting upon a previous imprint and incapable of printing upon a card which the workman has failed to insert to the proper degree or in the proper condition of alignment. The time recorders of the present invention thus insure accuracy of imprinting of the time records upon the card, both as to spacing and as to legibility.

A further objective of the invention has been to provide a time recorder in which time entries appear consecutively in columnar form, and in such order that the time elapsing between consecutive entries may be determined by simple subtraction of the one entry from the one which is directly above it. This direct subtraction feature facilitates time computations by the clerk and thus helps to eliminate clerical errors.

A still further objective of the present invention has been to provide a time recorder which is operable automatically in response to the insertion of a time card and which, by the arrangement of its imprinting, differentiates those entries made on one day from those entries which are made on the preceding or succeeding days. In the preferred utilization of this principle of the invention, the time entries of all days are made in a single column, but the entries designating any particular day are staggered, or spaced laterally, from the entries designating the succeeding or preceding day.

Briefly, the machines of the present invention embody a stop against which an edgewise rest portion of an inserted time card is brought into abutment preceding a time printing operation, a printing mechanism actuable to imprint a record of prevailing time upon the card face, and a correlating notching device for providing a new rest surface on the card edge, spaced from the preceding rest edge of the card a distance corresponding to the spacing desired between consecutive time imprints. In consecutive insertions, the card itself occupies consecutively spaced positions, each determined by the rest notch which was cut into the card as an incident to the next preceding actuation of the time recorder. In this manner, time notations are caused to appear upon the card face in spaced order facilitating time computations.

In such an arrangement, satisfactory results are obtained so long as the workman is careful in inserting the card properly. But if the workman inserts the card only partially, leaving a space between the rest edge and the stop, then a print can be made over a previously printed portion of the card, or in the space partly between previous imprints, with resulting illegibility or confusion in the records. A principal feature of the present invention resides in an interlock system which necessitates correct insertion of a card before printing is permissible. Further, a recorder is contemplated in which the card must be withdrawn, or at least substantially withdrawn, before a next successive operation is permissible. This arrangement precludes unintended duplicate imprints. These features of the invention are embodied in a time recorder which is of the self-actuated type, that is, a recorder which is automatically energized to cause a printing operation to occur in response to a proper card insertion.

A preferred embodiment of the printing actuating mechanism and interlock system includes a solenoid, which when energized supplies motive power through appropriate linkage to a printing hammer and punch, and two switches which are placed in series connection in a voltage supply line of the solenoid so that the solenoid can be energized only when both switches are closed. One switch, the actuating switch, is provided with a finger which is preferably aligned with the notched portion of the cards and is engaged by the rest notch shortly before a card is brought into engagement with the stop pin. The second switch, or card positioning switch, is also provided with a finger which engages an inserted time card. However, the finger of the card positioning switch is spaced a substantial distance from the stop pin so that the finger is tripped by the card after the card has been only partially inserted into the recorder. Thus, when a card is placed in the recorder, the card positioning switch is closed first and functions to condition the actuating switch for control of the solenoid.

In making a registration a card is inserted into a suitable tray or slot, with the notched position of the card extending inwardly or downwardly. After the card has been partially inserted, it engages the finger of the card positioning switch thereby actuating that switch to condition the actuating switch. As the rest edge of the last formed notch approaches the stop pin it engages the actuating switch finger to energize the solenoid which, in turn, drives the printing mechanism and punch to cause a print to be made upon the card. The punch notches the card and thereby relieves the pressure exerted by the card upon the actuating switch finger.

So long as the solenoid remains energized the card is supported by the punch. However, should the solenoid become de-energized the punch would be retracted and the card would be free to move inwardly and re-engage the actuating switch finger causing undesirable operation, and resultant multiple printing. This would continue until the card was withdrawn or could move no further into the tray. I have found multiple printing can be prevented in a simple and effective way by providing an interlock between the solenoid plunger and the finger of the actuating switch. In the preferred embodiment, a hold down spring is secured, at one end, to the actuating switch and is linked at the other end to the solenoid plunger so that as long as the solenoid is energized the actuating switch is mechanically held closed. The solenoid may then be de-energized only by removal of the card past the card positioning switch. Because of this simple organization the card must be substantially withdrawn from the tray before the solenoid can become de-energized; hence the card must be deliberately re-inserted before a second registration can be made. Even if a second registration is intended to be made immediately after a first printing, the card will necessarily be spaced properly from the preceding registration.

From the foregoing discussion of card positioning, it is apparent that the registrations appear in ascending order starting at the bottom of the card, that is, the initial registration is made at the bottom of the card, and each of the succeeding registrations is spaced upwardly an even distance above the one preceding it. Thus, all of the entries appear directly above each other in a vertical line, and the "in" times may be subtracted from the "out" times by inspection from the figures imprinted upon the card, without the necessity of transposing or rearranging entries with the consequent possibility of clerical error.

To further facilitate the interpretation and checking of entries, notations of successive days are staggered; that is, the "day" marks, such as "Monday," "Tuesday," etc., are alternately indented toward, or spaced from the vertical column of time entries so that registrations made on each day cannot be confused with those made on the day preceding or the day following; a quick glance at the card will indicate whether an employee was absent or present on any given day.

These and other objects of my invention will be apparent from a further consideration of the following detailed description of the drawings in which a typical embodiment of the invention is disclosed. In the drawings.

Figure 1:
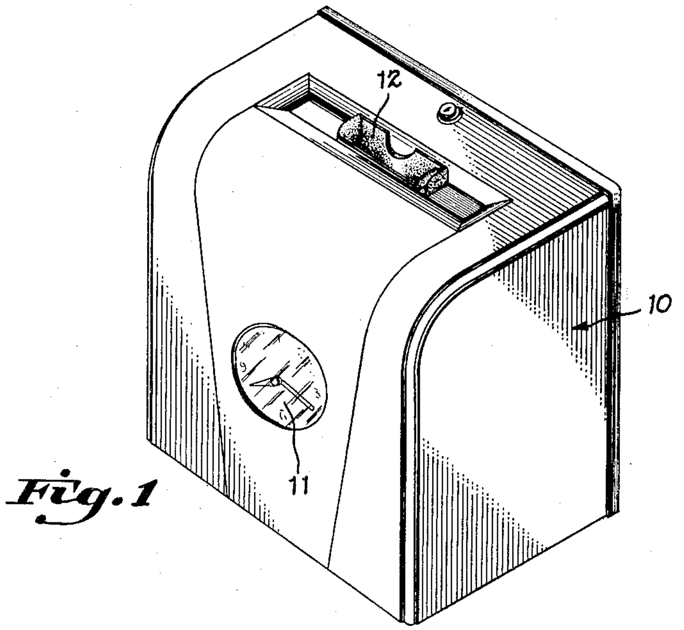
Figure 1 is a perspective view of a time recorder constructed in accordance with the present invention.
Figure 3:
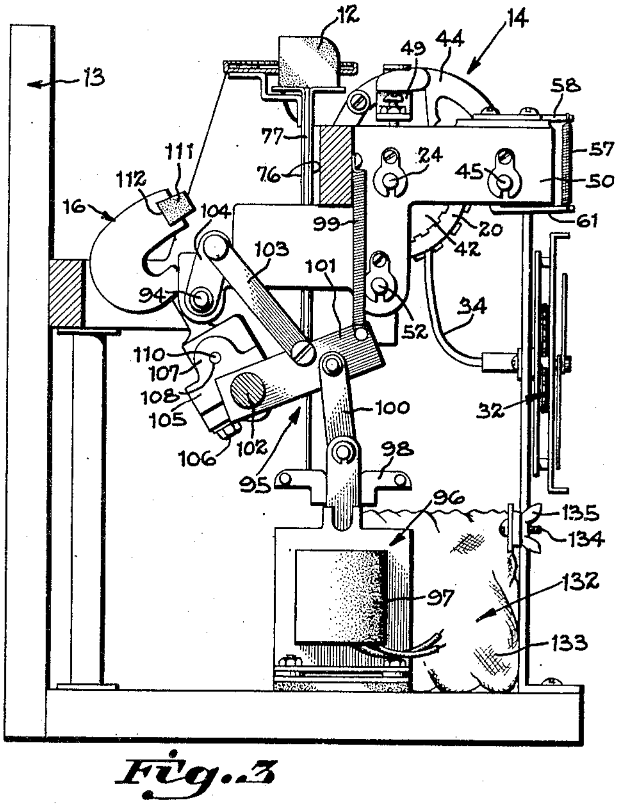
Figure 3 is a cross sectional view taken along line 3—3 of Figure 2.
Figure 2:
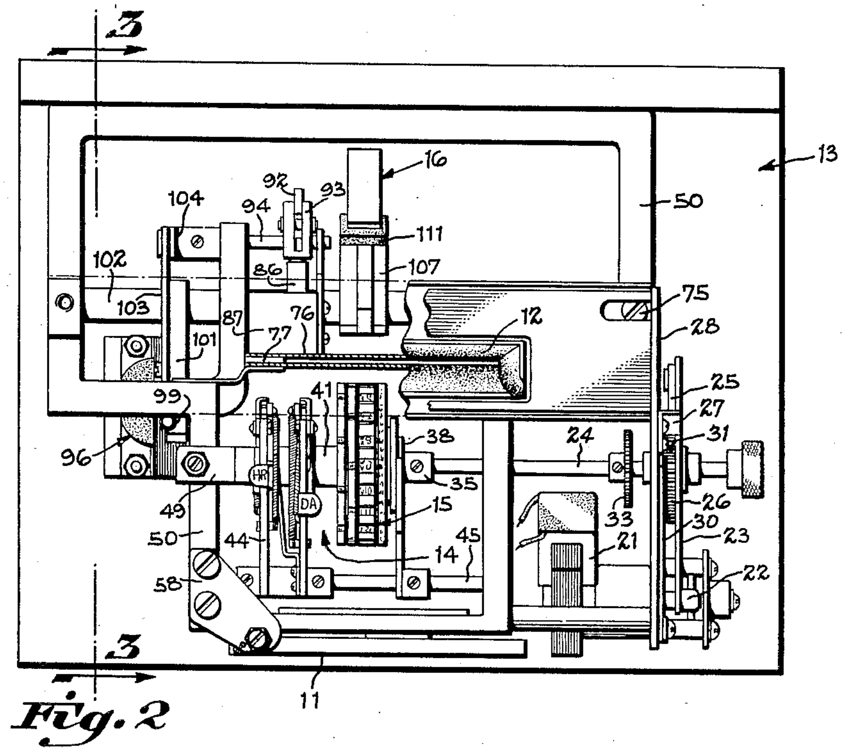
Figure 2 is a top elevational view of the recorder with the cover removed.

As shown in Figures 1, 2, and 3, the time recorder generally comprises a housing 10, a pilot clock 11, a card receiving tray 12, and a frame 13 which supports a printing mechanism, shown generally at 14, as well as clock 11 and tray 12. Preferably, the printing mechanism includes three time wheels 15 for imprinting the time card when it is forced against an inked ribbon (not shown) and the wheels by a trip hammer 16. The time wheels include; a minute wheel 17 having sixty sets of type, corresponding to the sixty minutes in an hour, equi-spaced about its periphery, and an hour wheel 18 provided with twenty-four equi-spaced sets of type denoting the twenty-four hours of a day. The third wheel is a day wheel 20 which is provided with a series sets of type adapted to print indicia denoting the various days of the week. In the embodiment shown, there are twenty-one such sets of type and the day wheel is indexed one twenty-first of a revolution every 24 hours to present a different set each day. The sets of type are alternately disposed adjacent to, and spaced from, the hour wheel 18 so that the entries of each day are readily discernable from those of the day preceding and the day following.

A drive mechanism is provided for rotating the minute, hour, and day wheels so that the prevailing time will be registered upon a card when it is forced against the wheels by printing hammer 16. In the embodiment shown, the driving mechanism includes a synchronous motor 21 which preferably drives cam 22 at a constant speed of one revolution per minute. Cam 22 is mounted upon the shaft of motor 21 and is in engagement with rocker arm 23 which is rotatably carried by shaft 24. One end of rocker arm 23 is spring urged into engagement with cam 22, while the opposite end of the arm carries pivoted pawl 25. Pawl 25 is in engagement with gear 26 which is also mounted upon shaft 24 and is adapted to abut stop 27 mounted upon side plate 28. A spring urged locking arm 30 is also mounted upon side plate 28 and is provided with a pin 31 which rides against gear 26 to prevent any retrograde movement thereof. A gear drive shown generally at 32 (Figure 3), including gear 33, mounted upon drive shaft 24, turns pilot clock 11 through cable 34.

Figure 5:
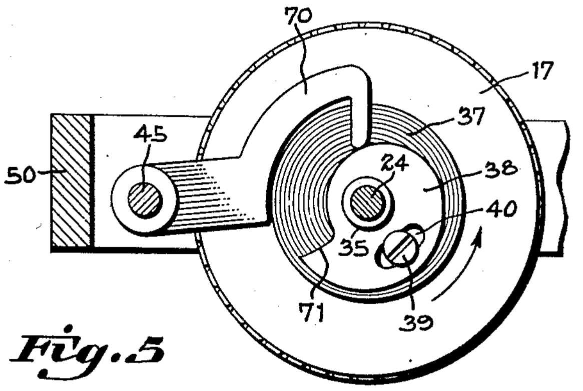
Figure 5 is a cross sectional view taken along line 5—5 of Figure 4.

The printing mechanism includes a hub 35 which is mounted upon drive shaft 24 and is held in place as by set screw 36. As shown in Figure 5, minute wheel 17 and plate 37 are carried by hub 35. Cam 38 also fits over hub 35 and is adjustably secured to plate 37 by means of set screw 39, which passes through slot 40 in cam 38 and threadably engages plates 37. Hour wheel 18 is mounted upon hub 41 which is, in turn, rotatably carried by shaft 24. A toothed ratchet wheel 42 is also mounted upon hub 41 for driving the hour wheel in a manner to be explained later.

Figure 4:
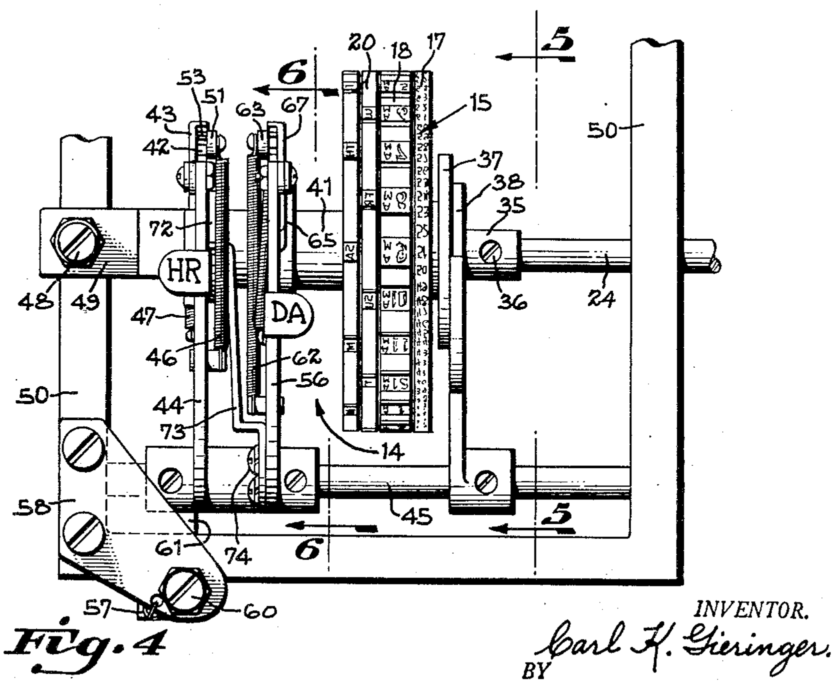
Figure 4 is an enlarged top view of the printing mechanism.

As shown in Figure 4, ratchet wheel 42 is driven by means of pawl 43 which is pivotally secured to trip arm 44 carried by shaft 45. Spring 46 is effective to urge trip arm 44 downwardly and spring 47 which is fastened to arm 44 and pawl 43 urges the pawl into contact with wheel 42. A bolt 48, which is secured to flange 49 of arm 44, and which abuts frame member 50 adjustably limits the movement of arm 44 downwardly. Locking arm 51, pivotally mounted upon shaft 52 is provided with a finger (not shown) which normally engages ratchet wheel 42 to lock that wheel in position. Spring 46, which urges arm 44 downwardly, also urges arm 51 against ratchet wheel 42. The locking arm 51 is provided with a pin 53, which is adapted to engage pawl 43 and be forced outwardly thereby to free the finger from engagement with ratchet wheel 42 and permit the wheel to be rotated by the pawl.

Figure 6:
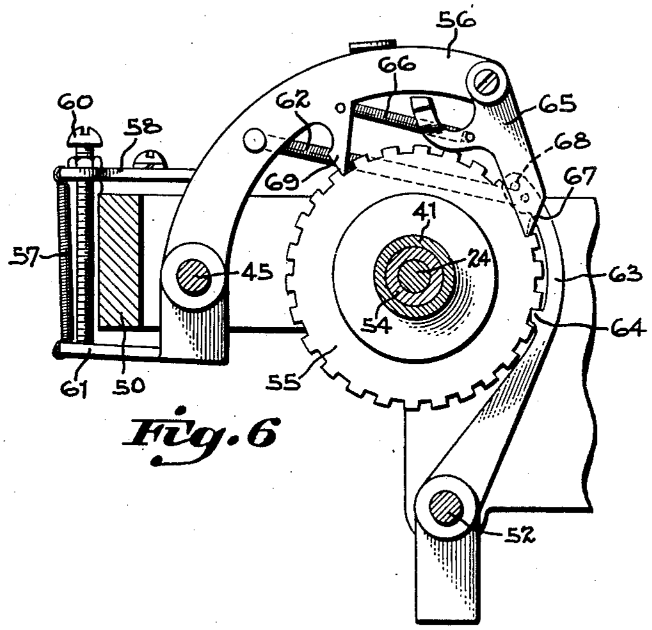
Figure 6 is a cross sectional view taken along line 6—6 of Figure 4.

The day wheel assembly includes a hub 54 which carries ratchet wheel 55 and day printing wheel 20. The trip arm mechanism for driving the day wheel is almost identical with that for the hour wheel and while the exact construction constitutes no part of the present invention its operation will be outlined and may best be understood from Figure 6. Trip arm 56 is pivotally mounted upon shaft 45 and is urged downwardly by spring 57 which is secured to plate 58 mounted upon frame member 50. An adjusting bolt 60 is threaded through plate 58 and engages flange 61 of trip arm 56 to limit the downward movement of that arm. Spring 62 interconnects arm 56 and locking arm 63 to urge the locking arm into contact with wheel 55. Lock arm 63 is provided with a finger 64 which normally engages ratchet wheel 55 and prevents any retrograde movement thereof. Pawl 65 which is pivotally secured to trip arm 56, is urged in a clockwise direction by spring 66. The angulated surface 67 of pawl 65 is adapted to engage pin 68 of locking finger 63 whenever trip arm 56 is rotated counter-clockwise, thereby, freeing finger 64 from engagement with ratchet wheel 55 to permit the pawl to turn that wheel in a clockwise direction. Finger 69 of trip arm 56 also engages ratchet wheel 55 and limits the movement of that wheel on each tripping of arm 56.

In operation, arcuate follower 70 which is secured to shaft 45 and engages cam 38, forces shaft 45 to rotate counter-clockwise as the main drive shaft 42 is turned by the driving mechanism. As shaft 45 rotates counter-clockwise, trip arm 44 is also rotated counter-clockwise and pawl 43 is drawn up over the pin provided on locking arm 51. When follower 70 hits drop 71 in cam 38, the trip arm 44 is free to rotate downwardly under the influence of spring 46. When arm 44 rotates downwardly, pawl 43 engages the pin on locking arm 51 and disengages the finger from ratchet wheel 42 so that the pawl forces the ratchet wheel 42 to rotate. Cam 72 is bolted or otherwise secured to ratchet wheel 42 for rotation therewith and a follower 73 engages cam 72 and is secured to ratchet arm 56 as by bolts 74. Ratchet wheel 42 makes one revolution every 24 hours and arm 56 is tripped once each day to rotate the day printing wheel in the same manner in which arm 44 rotates ratchet wheel 42.

Figures 7, 10:
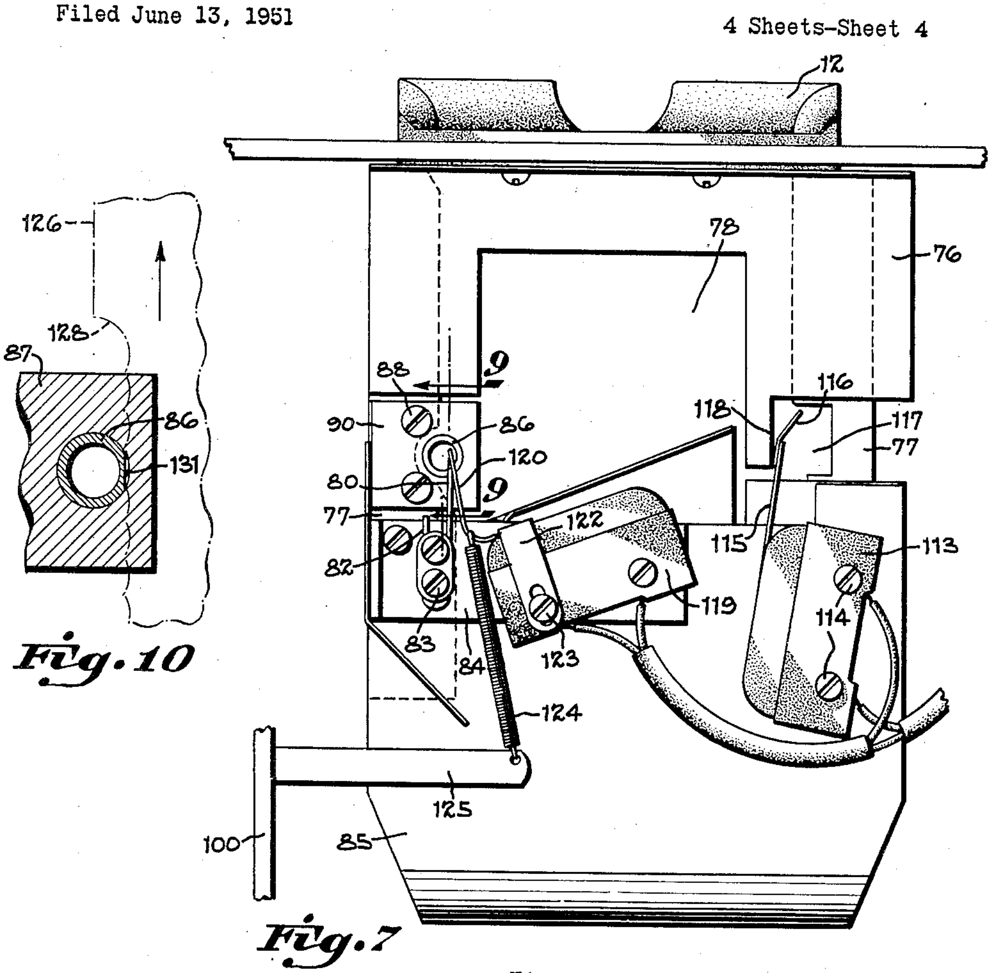
Figure 7 is a partial front elevational view of the card tray assembly.
Figure 10 is a cross sectional view of the punch and punch block taken along line 10—10 of Figure 9, showing the manner in which a card is withdrawn through the notch provided in the punch.
Figure 8:
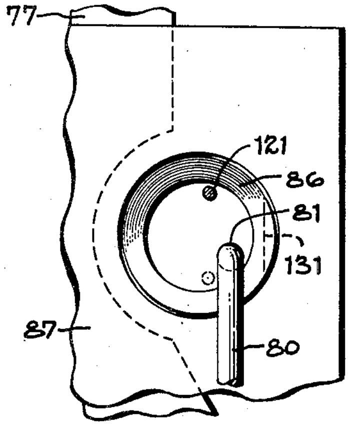
Figure 8 is an enlarged view of the punch and punch block shown in Figure 7.

A card receiving tray 12 is provided to support the cards for printing and is secured to frame member 50 as by bolts 75. The tray, which also defines a guideway through which the cards are inserted in proper relationship with the printing mechanism, comprises two spaced plates 76 and two plates 77 which are partially interposed between plates 76, and spot welded to a slot into which a card may be inserted. The central portion 78 of the plates 76 is removed so that the printing hammer 16 may strike that part of the card which is thus exposed and force it against the printing wheels 15 for registration (the usual ribbon and ribbon winding mechanism are omitted since they constitute no part of the present invention). Plates 77 limit the transverse movement of the cards in the slot and also function to align the cards vertically. The depth to which a card may be inserted is limited by stop pin 80 which in the embodiment shown (Figures 7 and 9) is constituted by a piece of stiff wire which is bent at its upper end 81 to form an abutment surface for engaging the card. The lower end 82 of the pin is fastened as by bolts 83 to plate 84 which is, in turn, secured to plate 85 of the tray aassembly.

Figure 9:
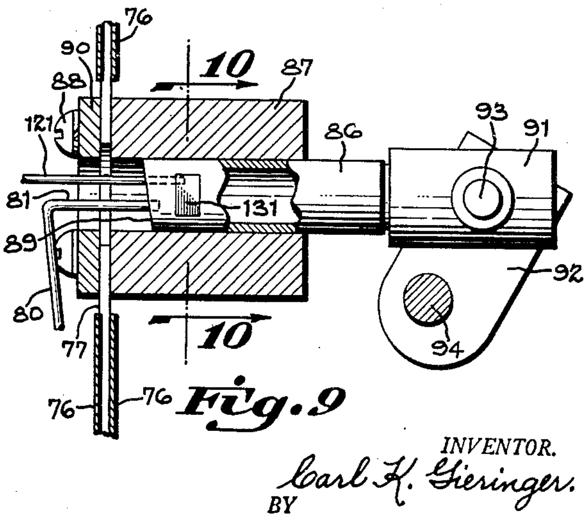
Figure 9 is a cross sectional view of the punch and punch block taken along line 9—9 of Figure 7.

The chip cutting mechanism for notching the edge of a card includes a hollow cylindrical punch 86 which is slideably mounted in punch block 87 (Figure 9). Punch block 87 is secured to plate 77 of the tray assembly by means of bolts 88 passing through block 90, which forms the female die of the punch, and plate 77. Preferably the leading or cutting edge 89 of the punch is angulated so that it progressively shears the card, thereby reducing the power required for actuating the punch. The rear end of the punch is provided with a collar 91 which is slotted to receive throw rod 92 which is pivotally secured to the punch by pin 93. Throw rod 92 is fixedly mounted upon shaft 94 which is connected by a linkage shown generally at 95 to solenoid 96.

More specifically, solenoid 96 is of a conventional type including an electrical coil 97 and a magnetically responsive armature 98 which is spring urged upwardly by spring 99 and is drawn downwardly whenever the coil 97 is energized. Links 100 interconnect armature 98 and rod 101 which rotates about shaft 102. Link members 103 and 104 are effective to turn shaft 94 to force the punch against a card each time the solenoid is energized.

The printing hammer assembly includes hammer 16, shaft 102 and hammer mounting block 105. The mounting block 105 is provided with a bore for receiving shaft 102 and is secured to the shaft by means of bolts 106. Mounting block 105 also includes two upturned flanges 107 each of which is provided with an aperture 108 in parallel alignment with shaft 102 for receiving pin 110 which carries hammer 16. Hammer 16 is preferably provided with a hard rubber head 111, mounted in a slot 112 in the end of hammer 16. The hammer is free to rotate about pin 110 through a limited travel but is spring urged away from the printing wheels (counter-clockwise in Figure 3). The hammer is thus held by the spring away from contact with the printing wheels except during the first instant of the solenoid energization when the momentum of the hammer overcomes the spring force and the hammer strikes the card forcing it against the printing wheel. This construction prevents blurred registrations due to a card's being held against the printing wheels by the hammer during the withdrawal of the card from the recorder.

The mechanism for automatically actuating the punch and hammer includes two switches which are preferably snap-action micro switches and are placed in series connection with power supply line of the solenoid coil 96 to control its energization. Positioning switch 113 is mounted upon plate 85 forming part of the tray assembly by means of bolts 114. The positioning switch is provided with a finger 115 having an angulated portion 116 which resides in slot 117 formed in plate 77. The finger 115 normally resides against the inner edge 118 of the slot 117 but is forced away from the edge, closing the switch whenever a card is partially inserted in the tray.

When positioning switch 113 is closed, the actuating switch 119 is conditioned to energize the solenoid whenever a card depresses finger 120 carrying pin 121. Pin 121 is preferably aligned with the bent portion 81 of stop member 80 and extends through the hollow portion of punch cylinder 86. Vertical movement of pin 121 is limited by clip 122 which is bolted to the positioning switch 119 as by bolts 123 and is provided with a U-shaped enclosure through which finger 120 passes; vertical movement of the finger being limited by its engagement with the upper and lower edges of the U-shaped enclosure. Finger 120 is linked to the solenoid armature 98 preferably through spring 124 and links 125, and 100.

Figure 11:
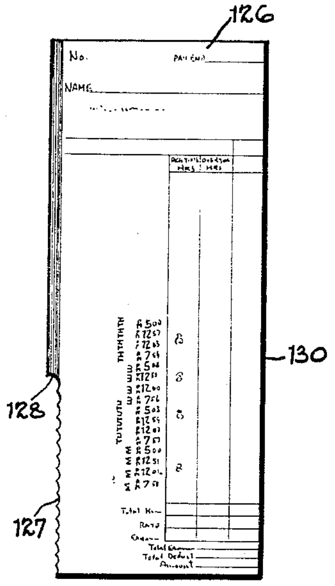
Figure 11 is a view of a time card, showing the staggered day of the week registrations and the relationship of the registrations and spacing notches.

In operation, a card such as card 126 shown in Figure 11 is inserted into the card receiving tray 12 with the notched portion 127 of the card adjacent the left edge of the slot. The card is guided vertically by plates 77 and is inserted into the recorder until the edge 128 of the last formed notch abuts stop pin 80. As the right end edge 130 of the card moves past finger 115 of positioning switch 113, the finger is forced outwardly to close that switch and condition the actuating switch for control of the solenoid. Just prior to its abutment with stop pin 80, notched edge 128 forces pin 121 downwardly to close the actuating switch 119, completing the circuit to the solenoid. Upon energization of solenoid 97 magnetically, responsive armature 98 is forced downwardly, rotating hammer 16 which strikes the card forcing it against the printing wheels to make a registration. Simultaneously punch 86 is forced through the card forming another notch therein.

After a card has been printed and punched the solenoid remains energized since the actuating switch 119 is held closed by means of spring 124 and the positioning switch is held closed by the card 126. The card is supported by the upper edge of the punch 86 which is held in the advanced position by linkage 95. Should a card be partially withdrawn from the tray the solenoid will still remain energized until the right hand edge of the card has moved past finger 115 to open the card positioning switch 113. As a result, it is impossible for more than one impression to be made when a card is inserted for printing unless the card is removed beyond the card positioning switch and deliberately reinserted into the tray. It will be noted that punch 86 is preferably provided with a vertical slot or relieved portion 131 to facilitate withdrawal of the notched cards.

When the card is next presented for registration it will move an additional distance into the card receiving tray (equal to the width of one notch) before engaging the stop and the registration made at that time will be correspondingly spaced above the preceding registration. Each registration is thus made directly above the preceding one and is spaced at a uniform distance from it. The positioning of a card in the recorder is thus controlled by the mutilation of the individual card and is not determined by any shifting mechanism within the recorder which positions all cards identically. As a result, consecutive registrations always appear in proper sequence on a card no matter how many registrations are made during any period or at what irregular intervals the registrations are made.

As shown in Figure 11, the hour and minute entries appear in a vertical line which arrangement greatly facilitates rapid and accurate computation since the "in" times may be directly subtracted from the "out" times which appear directly above them to determine the actual working time. To further facilitate rapid computation and checking and to minimize the possibility of clerical error, the "day" registrations are staggered so the entries made on a particular day are clearly discernable and cannot be confused with those of the preceding or succeeding day. Thus, for example, each entry which is made on Wednesday has the "day" entry "W" made adjacent the hour entry while in the Tuesday and Thursday registrations the "Tu" and "Th" marks are spaced from the hour entries to prevent confusion.

To facilitate removal of the chips which have been punched from the card as an incident to each registration, a basket 132 is provided under the punch assembly. It will be recalled that a card is struck by the punch as it advances from the punch block 87 transversely across the guideway defined by the tray 12, and into the femal die block 90, which is disposed on the opposite side of the guideway from block 87. The chip which is thus severed from the card is driven by the punch through the female die block 90 and drops in the basket 132. In the preferred embodiment, basket 132 is formed of cloth 133, or some similar material which is fitted over a bent wire form 134. Each end of wire 134 is secured to the frame as by wing nuts 135. Hence, to remove the accumulated chips, it is only necessary to loosen the wing nuts and remove the basket, which can be emptied and then readily replaced.

Having described my invention, I claim:

1. In a time recorder having a printing mechanism, a solenoid for driving said printing mechanism, a guideway for reception of a card, a fixed abutment member extending transversely of said guideway for engaging said card to position it for printing, means for preventing multiple printing, which means include a first switch and a second switch in series connection with said solenoid, said first switch having a card engaging finger disposed in said guideway and spaced from said abutment member, said second switch having a card engaging finger disposed in said guideway adjacent said abutment member, whereby said first switch is closed when a card is partially inserted in said tray and thereby conditions said second switch for control of the solenoid, and mechanical linkage means interconnecting said second switch finger and said solenoid for holding said finger closed so long as said solenoid is energized.

2. A time recorder comprising, a guideway adapted for reception of a time card, a stop positioned in the card path in said guideway, a punch positioned adjacent said stop and actuable by a solenoid to notch the said card and thereby produce a new edge thereon which is engageable with said stop upon the next successive insertion of the card into said guideway, said punch being constituted by a hollow cylindrical member having a beveled cutting face whereby minimum power is required to drive said punch and a switch for controlling the energization of said solenoid, said switch having a finger being disposed for telescopic engagement with said punch.

3. A time recorder comprising, a guideway adapted to receive a time card, a punch movable transversely of said guideway for notching a card which is inserted in said guideway, said punch being constituted by a hollow cylindrical member, a stop positioned in said guideway, a portion of said stop being disposed in telescopic relationship with the hollow portion of said punch.

4. A time recorder comprising, a guideway adapted to receive a time card, a punch movable transversely of said guideway for notching a card which is inserted in said guideway, said punch being constituted by a hollow member, a stop positioned in said guideway, a portion of said stop being disposed in telescopic relationship with the hollow portion of said punch so as to be engageable by an edge-wise position of the card which has been delineated through punch actuation.

References Cited in the file of this patent

UNITED STATES PATENTS

| | | |
|---|---|---|
| 923,074 | Pollock | May 25, 1909 |
| 1,022,694 | Morrison | Apr. 9, 1912 |
| 1,304,618 | Sohm | May 27, 1919 |
| 1,348,218 | Goss et al. | Aug. 3, 1920 |
| 1,881,090 | Moulton | Oct. 4, 1932 |
| 2,039,600 | Locke | May 5, 1936 |
| 2,270,591 | Keckley | Jan. 20, 1942 |
| 2,555,198 | Laurent | May 29, 1951 |